United States Patent [19]

Svensson

[11] 4,381,237
[45] Apr. 26, 1983

[54] SLUDGE ROBOT

[76] Inventor: Tord Svensson, Dammgatan 8, S-552 76 Jönköping, Sweden

[21] Appl. No.: 285,107
[22] PCT Filed: Oct. 28, 1980
[86] PCT No.: PCT/SE80/00260
 § 371 Date: Jul. 17, 1981
 § 102(e) Date: Jul. 17, 1981
[87] PCT Pub. No.: WO81/01372
 PCT Pub. Date: May 28, 1981

[30] Foreign Application Priority Data

Nov. 20, 1979 [SE] Sweden ................ 7909592

[51] Int. Cl.³ .............................. B01D 21/20
[52] U.S. Cl. ...................... 210/138; 210/141; 210/143; 210/523
[58] Field of Search ............... 15/1.7, 302, 304; 210/138, 141, 143, 170, 241, 523–525, 531

[56] References Cited

U.S. PATENT DOCUMENTS

| | | | |
|---|---|---|---|
| 2,988,762 | 6/1961 | Babcock | 15/1.7 |
| 3,416,776 | 12/1968 | Ravitts | 15/1.7 |
| 3,796,658 | 3/1974 | Meissner, Sr. | 210/523 X |
| 4,152,800 | 5/1979 | Nilsmar | 15/1.7 |

FOREIGN PATENT DOCUMENTS 667507 6/1979 U.S.S.R. ................ 210/525

Primary Examiner—Robert H. Spitzer
Attorney, Agent, or Firm—Cushman, Darby & Cushman

[57] ABSTRACT

A sludge robot for the removal of sludge from sedimentation tanks having planar bottoms comprises a rising tube (3) and two tube arms (5, 8) which are interconnected by two motor couplings (1, 2), by means of which the tube arms can be steered along a predetermined track over the whole bottom of the tank and suck the whole bottom free from sludge through a suction opening.

Steering of the motor couplings is carried out by means of a micro dator (18) programmed for the relevant tank size. The sludge robot operates close to the tank bottom all the time and permits other applications in the upper portion of the tank. Starting time and cycle time for the sludge robot are adjustable.

9 Claims, 3 Drawing Figures

SLUDGE ROBOT

This invention relates to a sludge robot for the removal of sludge and sedimentable particles from sedimentation tanks, of the type generally set forth in the precharacterizing clause of claim 1.

It is previously known to construct apparatus for the removal of sludge from sedimentation tanks. Such apparatus of the prior art may be comprised of sludge scrapers, perforated suction pipes, floating pumps governed by chain drives at the tank edge, etc. In many cases the tanks are built with an inclined bottom, so that the sludge becomes assembled in a central zone from which it may be pumped away.

The drawbacks of these systems of the prior art reside therein that they are cumbersome and expensive, E.g. when sludge scrapers are installed in rectangular tanks the sludge scrapers travel around in a chain drive above or in the water surface and proceed downwards along a short wall of the tank and further along the bottom where they scrape the sludge in the direction towards the other short wall of the tank, where some form of depression or cavity is provided, from which the sludge may be pumped off. With scrapers of this kind, which are very expensive in installation and require extensive service, the entire tank surface is blocked for all other devices. Perforated suction tubes become clogged, after which the sludge is only sucked off through some of the perforations and the remainder of the sludge in the tank will remain, since the sludge is thixotropic. Floating pumps governed by cable drives and other queer apparatus which are positioned on and along the tank edge also prevent the mounting of other apparatus in the tank. Inclined bottoms result in a very expensive building form and in high costs for excavation and possible blasting, since the tanks become much deeper than tanks having a planar bottom.

By the present invention a sludge robot is provided with a building form which deviates from previously known systems and eliminates the drawbacks thereof. To obtain an optium sludge removal the sludge robot sweeps the entire bottom of the tank, simultaneously as it constitutes no obstacle to other devices immersed into or mounted at the water surface in the tank.

Said yield is obtained by pumping the sludge, preferably by means of a mammoth pump, from the bottom of a sedimentation tank to a sludge silo or a sludge treatment unit, through the sludge robot. The sludge robot consists of a vertical rising tube which is mounted at one tank wall, most suitably in the middle of a longitudinal wall of the tank. In the lower portion of the rising tube there are provided two tube arms one of which is connected to the rising tube by means of a motor coupling. Said one tube arm is perpendicular to the rising tube. The two tube arms are interconnected through a further motor coupling. Between the tube arms and the motor coupling there are provided two angle pieces so that the tube arms are parallel to each other in the horizontal plane, and the outer tube arm is oriented below the inner tube arm which is connected to the rising tube. At the outer end of the outer tube arm there is provided an angle piece which makes the inlet opening for the sludge face the bottom of the tank. The motor couplings are preferably driven by rectified low voltage current and are constructed according to the step motor principle. The motor couplings are governed by a micro dator which is programmed for the relevant tank size. The suction opening sweeps the whole tank bottom according to the programmed pattern, preferably in a meander or serpentine track with close windings. The cycle time is adjustable to be able to be varied at variations in the sludge production. A timer starts the program one or several times every 24 hours.

The advantages which have been achieved in the form of an efficient removal of the sludge from the tank bottom may be attributed to the means for moving the tube arms when the apparatus according to the invention is designed in accordance with the characterizing clause of claim 1.

A couple of examples of an embodiment of a sludge robot will be described in the following with reference to the annexed drawing.

Figure 1:
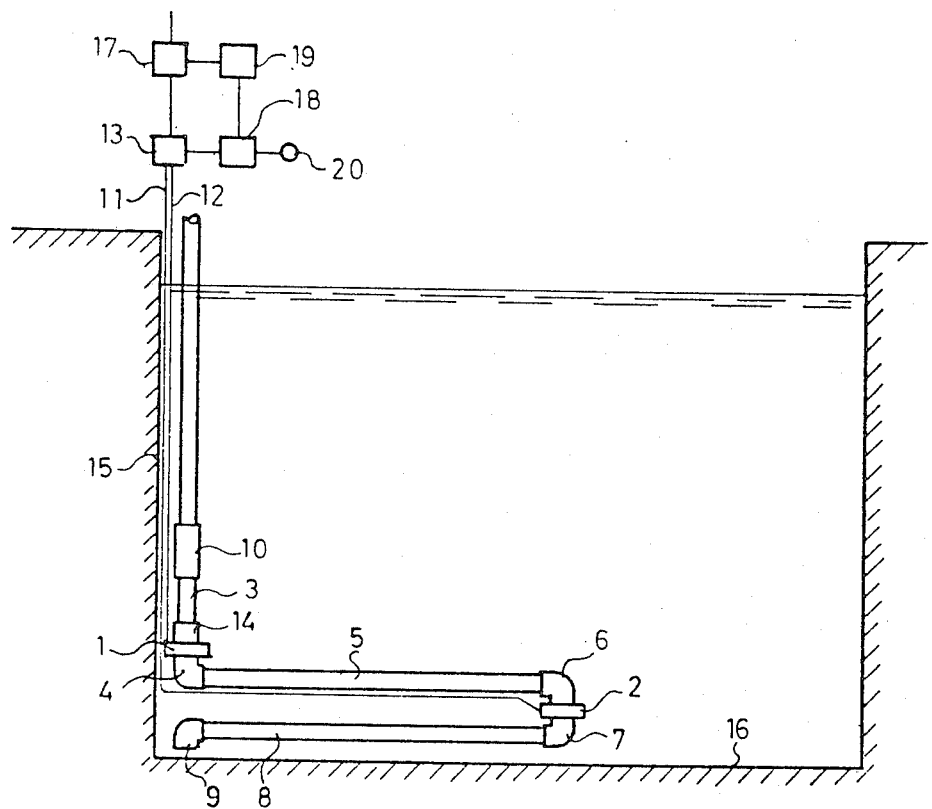
FIG. 1 is a vertical cross sectional view of a sludge robot mounted in a tank.
Figure 2:
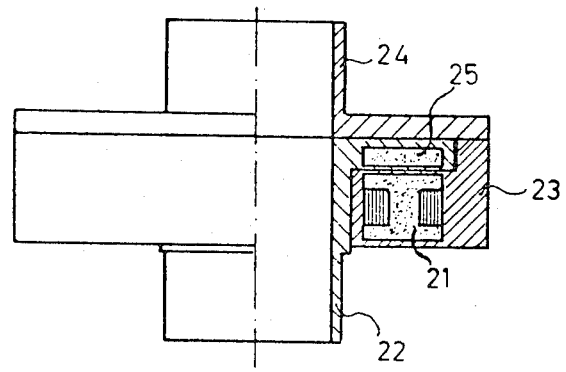
FIG. 2 is a very simplified view of a motor coupling.

The sludge robot of FIGS. 1 and 2 may represent the construction which is adopted in the specimen contemplated herein.

The sludge robot according to FIG. 1 has a round rising tube 3 attached to a tank wall 15 and connected to a motor coupling 1 by means of a socket 14. Rising tube 3 interconnects the socket 14 with a mammoth pump 10. To the underside of the motor coupling 1 an angle piece 4 is attached which is rigidly connected to a tube arm 5. In the outer end of the tube arm 5 there is provided an angle piece 6 which is rigidly connected therewith and secured to the upper side of the motor coupling 2. The motor coupling 2 is identical to the motor coupling 1. To the underside of the motor coupling 2 an angle piece 7 is attached which is rigidly connected to a tube arm 8, identical to the tube arm 5. To the outer end of the tube arm 8 there is attached an angle piece 9 having its opening facing the bottom 16 of the tank. The motor couplings 1, 2, the tube arms 5, 8, rising tube 3 and the angle pieces 4, 6, 7, 9 have the same inside diameter.

For current supply and control of the motor coupling 1 there is a cable 12 which is connected to a swith 13. For current supply and control of the motor coupling 2 a cable 11 is provided which preferably is connected to switch 13. This switch 13 is controlled by a micro dator or microcomputer (a microprocessor supplemented with storage units and inputs and outputs) 18 which is pre-programmed for the relevant tank size. Current supply is taken from the electrical network through a rectifier unit 17. The starting time for the sludge suction cycle is set by means of a timer 19, and the cycle time is adjusted by means of a control knob 20.

FIG. 2 illustrates the motor coupling 1 and 2, respectively, whose construction consists of a stator 21 embedded in a plastic molding 23 in the exemplificatory embodiment described above. The plastic 23 constitutes a bearing casing for the coupling rod and is screwed to a plastic flange 24. Between the plastic flange 24 and the bearing casing 23 there is provided a second plastic flange 22 in which a rotor 25 is embedded by molding. The motor of the motor coupling is basically a reluctance reductor step motor having 5° rotation for each step.

Figure 3:
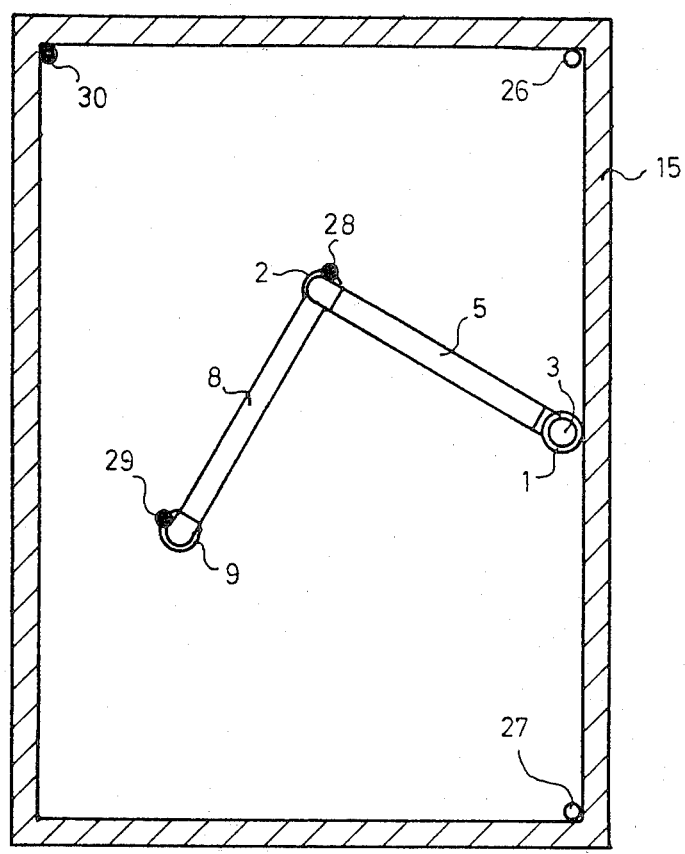
FIG. 3 is a plan view of a tank provided with a sludge robot; and illustrates an example of the positions of ultra sonic transmitters and receivers for locating the position of the sludge robot.

The embodiment now described exemplifies and electrical driving system. FIG. 3, in which the same reference characters as above have been used for designating same or similar details, illustrates a further example of an electrical driving system. 15 is a plan view of a tank, the sludge robot being mounted on one longitudinal wall of the tank. Beneath the rising tube 3 the motor coupling 1 is connected to the tube arm 5, which has its other end connected to the motor coupling 2 as before. Furthermore, the tube arm 8 is connected between the motor coupling 2 and the suction angle 9.

For the location of the tube arms 5, 8 in the tank one supersonic transmitter 28 is mounted in connection with the motor coupling 2 and another supersonic transmitter 29 at the suction angle 9. By means of two receivers 26 and 27, respectively, the signals from the transmitters 28 and 29, respectively, are picked up, and a micro dator calculates the position of the respective transmitters 28 and 29. A further transmitter 30 which constitutes a reference transmitter is mounted in one of the corners of the tank. By means of this reference transmitter 30 the measures of the tank 15 are also determined. When utilizing this method of measuring it is possible to use ordinary induction motors in the motor couplings 1 and 2, respectively.

However, alternative designs are possible, e.g. a sludge robot which is driven pneumatically or hydraulically. Thus, the invention is not to be considered as limited to what is shown and described in the preceding, but such modifications are comprised by the inventive concept and are to be considered as being within the scope of the following claims. For example, the tube arms may be more than two in number. Furthermore, the transmitters 28-30 and the appurtenant receivers may be constructed for other waves than supersonic waves.

I claim:

1. A sludge robot for removal of sludge and sedimental particles from a sedimentation tank or the like and comprising a rising tube and at least two tube arms of which one is rotatably connected to the rising tube at its one end and the second tube arm is rotatably connected to the other end of said one tube arm and at its one end and has a suction inlet at its other, free end, characterized by the provision of motor couplings, which interconnect said one tube arm with the rising tube on one hand and the second tube arm on the other hand, for rotating the two tube arms which are provided in the lower portion of the tank, adjacent to its bottom according to a predetermined program, and control means for steering the motor couplings in such a way that the suction inlet moves in a predetermined movement pattern over substantially the whole bottom of the tank.

2. Sludge robot according to claim 1, characterized in that said control means is a micro-computer programmed for the relevant tank size.

3. Sludge robot according to claim 2, characterized in that the motor couplings comprise induction motors.

4. Sludge robot according to claim 3, characterized by the provision of transmitters and receivers associated therewith for the control of the micro-computer.

5. Sludge robot according to claim 1, characterized in that the motor couplings are manufactured of plastic which constitutes slide bearings for the couplings, which comprise a motor having a stator and a rotor which are embedded by molding in said plastic.

6. Sludge robot according to claim 1, characterized in that the motor couplings are constructed as step motors, which are steerable stepwise into fixed positions by said control means.

7. Sludge robot according to claim 1, characterized in that the motor couplings have the same inside diameter as the tube arms, so that no restriction of the sludge transport occurs.

8. Sludge robot according to claim 1, characterized by the provision of a timing knob for the control of the length of the movement pattern or the sludge suction cycle.

9. Sludge robot according to claim 1, characterized by the provision of a timer for starting a sludge sucking cycle.

* * * * *